US012786095B2

(12) United States Patent
Lo et al.

(10) Patent No.: US 12,786,095 B2
(45) Date of Patent: Nov. 3, 2026

(54) SUPPORTING ROAMING IN ETHERNET VIRTUAL PRIVATE NETWORK (EVPN) FABRIC

(71) Applicant: Arista Networks, Inc., Santa Clara, CA (US)

(72) Inventors: Alton Lo, Fremont, CA (US); Kumar Narayanan, Saratoga, CA (US); Venkata Ramchandra Murthy Jonnalagadda, Fremont, CA (US); Alex Nichol, Henley-on-Thames (GB)

(73) Assignee: Arista Networks, Inc., Santa Clara, CA (US)

( * ) Notice: Subject to any disclaimer, the term of this patent is extended or adjusted under 35 U.S.C. 154(b) by 248 days.

(21) Appl. No.: 18/669,527

(22) Filed: May 21, 2024

(65) Prior Publication Data

US 2025/0365227 A1 Nov. 27, 2025

(51) Int. Cl.
*H04L 45/02* (2022.01)
*H04L 45/76* (2022.01)

(52) U.S. Cl.
CPC .............. *H04L 45/02* (2013.01); *H04L 45/76* (2022.05)

(58) Field of Classification Search
CPC ..... H04L 45/02; H04L 45/76; H04L 12/4641; H04L 45/50; H04L 45/04; H04L 45/66; H04L 45/28; H04L 45/22; H04L 45/00; H04L 2101/622; H04L 12/4604; H04L 45/64; H04L 2012/4629; H04M 3/4878; Y02D 30/00
USPC .......................................................... 709/238
See application file for complete search history.

(56) References Cited

U.S. PATENT DOCUMENTS

| | | | | |
|---|---|---|---|---|
| 11,088,871 | B1 | 8/2021 | Lin et al. | |
| 11,398,927 | B1 * | 7/2022 | Malhotra | H04L 45/02 |
| 2009/0245259 | A1 | 10/2009 | Filsfils et al. | |
| 2012/0287817 | A1 * | 11/2012 | Yamaguchi | H04L 41/0853 370/254 |
| 2013/0010782 | A1 * | 1/2013 | Jensen | H04L 61/103 370/352 |
| 2017/0373973 | A1 | 12/2017 | Bickhart et al. | |
| 2019/0229937 | A1 | 7/2019 | Nagarajan et al. | |
| 2020/0127919 | A1 | 4/2020 | Nagarajan et al. | |

(Continued)

OTHER PUBLICATIONS

James Aweya, "Introduction to Switch/Router Architectures," in Switch/Router Architectures: Shared-Bus and Shared-Memory Based Systems , IEEE, 2018, pp. 1-16 (Year: 2018).*

(Continued)

*Primary Examiner* — Taylor A Elfervig
(74) *Attorney, Agent, or Firm* — Treyz Law Group; Jason Tsai

(57) ABSTRACT

A method of operating a network device is provided. The method can include detecting a first host device that is communicatively coupled to a first interface or port of the network device, identifying a first host profile identifier corresponding to a first class of devices to which the first host device belongs, and advertising, to one or more additional network devices, network reachability or routing information for the first host device. The network reachability information can include at least the first host profile identifier associated with the first host device and a first sequence number. The first sequence number may indicate a number of mobility or roaming events taken by the first host device.

20 Claims, 7 Drawing Sheets

(56) References Cited

U.S. PATENT DOCUMENTS

| | | | | |
|---|---|---|---|---|
| 2020/0213155 | A1* | 7/2020 | Bickhart | H04L 63/0272 |
| 2020/0244485 | A1 | 7/2020 | Gao et al. | |
| 2020/0322268 | A1 | 10/2020 | Thoria et al. | |
| 2021/0014166 | A1* | 1/2021 | Gao | H04L 12/4641 |
| 2021/0092045 | A1 | 3/2021 | Nagarajan et al. | |
| 2021/0120033 | A1* | 4/2021 | Gorrepati | H04W 12/106 |
| 2022/0103425 | A1 | 3/2022 | Lo et al. | |
| 2022/0417141 | A1 | 12/2022 | Thoria et al. | |
| 2023/0095253 | A1 | 3/2023 | Lin et al. | |
| 2023/0126279 | A1 | 4/2023 | Lin et al. | |
| 2023/0318961 | A1* | 10/2023 | Devarajan | H04L 63/105 370/389 |
| 2025/0220515 | A1* | 7/2025 | Jain | H04W 36/0069 |

OTHER PUBLICATIONS

S. Maurina, J. Fitzpatrick, L. Trifan and L. Murphy, "An enhanced bridged-based multi-hop wireless network implementation," 2010 The 5th Annual ICST Wireless Internet Conference (WICON), Singapore, 2010, pp. 1-9 (Year: 2010).*

T. Watteyne and P. Thubert, "Efficient 6LoWPAN Neighbor Discovery applied to Multilink IoT subnets," 2015 IEEE International Conference on Communications (ICC), London, UK, 2015, pp. 642-647 (Year: 2015).*

Zhou et al., "DHNet: A Distributed Network Architecture for Smart Home", 2024, ARXIV, Networking and Internet Architecture, p. 13 (Year: 2024).*

La. Burdet, Ed et al., EVPN Fast Reroute, Oct. 23, 2022, Internet-Draft: draft-burdet-bess-evpn-fast-reroute-03, Internet Engineering Task Force (IETF).

A. Sajassi, Ed., et al., BGP MPLS-Based Ethernet VPN, Feb. 2015, pp. 1-56, ISSN: 2070-1721, Internet Engineering Task Force (IETF).

* cited by examiner

PROFILE ID1 → FIRST SET OF CONTROL PLANE PARAMETERS

PROFILE ID2 → SECOND SET OF CONTROL PLANE PARAMETERS

PROFILE ID3 → THIRD SET OF CONTROL PLANE PARAMETERS

⋮

FIG. 7

SUPPORTING ROAMING IN ETHERNET VIRTUAL PRIVATE NETWORK (EVPN) FABRIC

BACKGROUND

This relates to network devices, and more particularly, to ways for operating network devices to interact with different classes of end host devices. As an example, a group of network devices implementing Ethernet Virtual Private Network (EVPN) can advertise routes to exchange network reachability information with one another. The advertised routes can include EVPN Network Layer Reachability Information (NLRI).

An end host device can establish a connection with an EVPN network device. The end host device can communicate with the EVPN network device via a wired connection or a wireless connection. There is, however, no mechanism in EVPN to discern whether the end host device is connected via a wired connection or a wireless connection to support wireless roaming. It is within such context that the embodiments herein arise.

BRIEF DESCRIPTION OF THE DRAWINGS

FIG. 7 is a diagram showing how different profile identifiers can be associated with different sets of control plane parameters in accordance with some embodiments.

DETAILED DESCRIPTION

Figure 1:
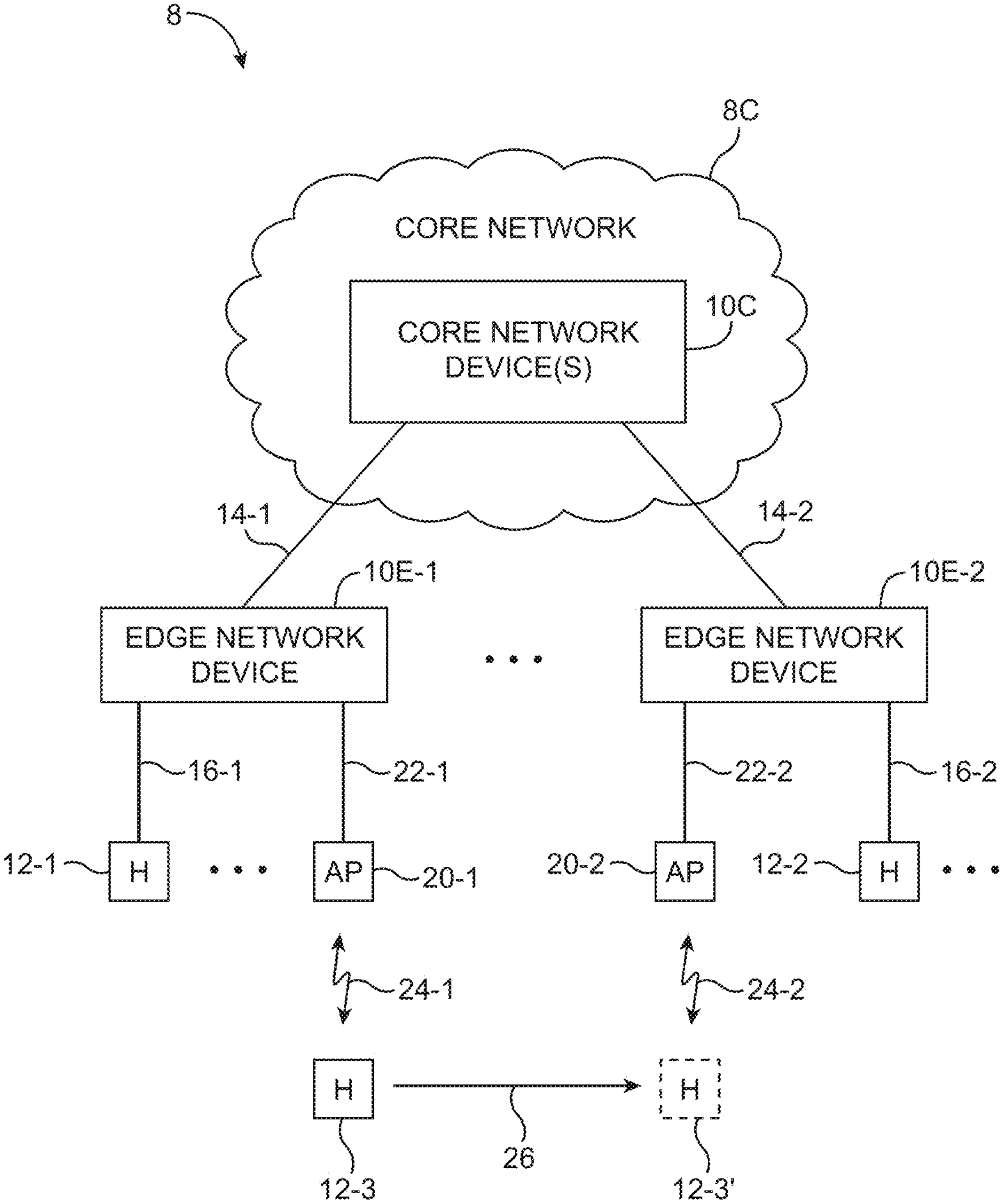
FIG. 1 is a diagram of an illustrative network having one or more edge network devices in accordance with some embodiments.

A network can convey network traffic in the form of data packets between different host devices. To properly forward the network traffic, the network can include a number of network devices. Some of these network devices may implement an Ethernet Virtual Private Network (EVPN) by exchanging network reachability information in the form of EVPN route information with one another and by processing the exchanged network reachability information. Ethernet VPN may refer to a technology for carrying layer 2 Ethernet traffic over a virtual private network, sometimes referred to as a layer 2 virtual bridge, using wide area network protocols. Configurations in which the exchange of EVPN route information occurs using Border Gateway Protocol (BGP), or more specifically Multiprotocol BGP (MP-BGP), and/or with Virtual Extensible LAN (VXLAN) or Multiprotocol Label Switching (MPLS) technology (e.g., using VXLAN or MPLS infrastructure, etc.) are sometimes described herein as examples. If desired, the exchange of route information can occur using types of control plane routing protocol and utilizing other types of underlying network infrastructure. EVPN network devices are sometimes referred to herein as EVPN peer devices, EVPN devices, and/or EVPN speakers.

An EVPN network can include a core network coupled to a plurality of edge network devices. The edge network devices can be coupled to different classes or types of host devices. As an example, a first class of host devices can be wired hosts that are physically coupled to an edge network device, whereas a second class of host devices can be wireless hosts that communicate with an edge network device via a wireless connection. When a host device begins sending traffic data to an edge network device, the presence of the host device can be learned or detected at a local interface of the edge network device receiving that traffic data. In response to detecting the host device, the edge network device can advertise to all EVPN peer devices network reachability information for the host device, which can include the MAC and IP addresses, a host profile identifier (ID) associated with a particular class of end hosts that this host device belongs to, and a sequence number. Different classes of end hosts may be assigned different profile identifiers. Each profile identifier can be associated with a different set of EVPN control plane parameters for the entire EVPN fabric. The profile identifier can be included as part of an EVPN extended community being advertised to the EVPN peer devices.

When the host device roams from the edge network device to another (second) edge network device in the network, the host device can be learned or detected at a local interface of the second edge network device receiving traffic data from the roaming host device. In response to detecting the host device, the second edge network device can advertise the network reachability information for the roaming host device, which will include its MAC and IP address, its host profile ID, and an updated sequence number. In particular, the sequence number can be incremented by one to indicate that the host device has roamed from the original edge network device to the second edge network device. By advertising the host profile ID of a roaming host device, the EVPN fabric can differentiate between different classes of end hosts and can apply or enforce different network policies accordingly. Operating a network in this way can be technically advantageous and beneficial to provide different treatment or different EVPN control plane (administrative) parameters for different classes of end host devices.

An illustrative networking system in which network devices such as the two or more EVPN network devices can operate is shown in FIG. 1. A network such as network 8 may be of any suitable scope and/or form part of a larger network of any suitable scope. As examples, network 8 may include, be, or form part of one or more local segments, one or more local subnets, one or more local area networks (LANs), one or more campus area networks, a wide area network, etc. Network 8 may include any suitable number of different network devices that connect corresponding host devices of network 8 to one another. If desired, network 8 may include or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

As shown in FIG. 1, network 8 may include a core network or core network portion 8C interconnecting different edge networks or edge network portions (sometimes referred to herein as sites or domains). As one illustrative example, core network portion 8C may be or form a backbone network such as a service provider network (e.g., an Internet or IP service provider network, a MPLS network, a cloud provider network, or generally a communications network core). Core network portion 8C may connect different edge network portions belonging to one or more entities (e.g., customers) different from or the same as the one or more entities that provide core network portion 8C. In configurations in which network devices implement one or more EVPN instances over core network portion 8C, core network portion 8C may sometimes be referred to herein as an EVPN core or generally an "underlay" network.

Core network devices 10C may sometimes be referred to as provider "core" (network) devices, whereas edge network devices 10E may sometimes be referred to as provider "edge" (network) devices. Core network portion 8C may include core network devices 10C that are interconnected with each other within core network portion 8C. Network paths 14 (e.g., one or more paths 14-1, one or more paths 14-2, etc.) may couple one or more core network devices 10C to edge network devices 10E (e.g., devices 10E-1, 10E-2, etc.) that interface the core network devices 10C with the edge network portions.

These edge network portions (e.g., sites or domains) may each include its own respective set of network device(s) and host device(s). An "edge network device" such as device 10E may thus refer to and be defined herein as a network device located at the periphery or edge of a network and that serves as an interface between end user (host) devices or networks and the core network portion 8C. Thus, edge network devices 10E can be configured to facilitate communication between end host devices and the rest of the network, as well as providing to the end hosts the services and resources offered by core network 8C.

In the example of FIG. 1, the first edge network device 10E-1 may be coupled to core network portion 8C via network path 14-1 and may be coupled to a first end host 12-1 via a network path 16-1 and to another network device such as a first access point 20-1 (e.g., a first wireless access point) via network path 22-1. On the other hand, the second edge network device 10E-2 may be coupled to core network portion 8C via network path 14-2 and may be coupled to a second end host 12-2 via a network path 16-2 and to another network device such as a second access point 20-2 (e.g., a second wireless access point) via network path 22-2. End hosts 12-1 and 12-2 can each be referred to as an end host device, a user device, a terminal device, or a client device.

The example of FIG. 1 in which network 8 includes at least two edge network devices 10E-1 and 10E-2 is illustrative. In general, network 8 can include three or more edge network devices 10E, four to ten edge network devices 10E, ten to a hundred edge network devices, or more than a hundred edge network devices 10E. Each edge network device 10E can be directly coupled to one or more end hosts 12 (e.g., via a physical or wired connection) and/or can be coupled to one or more wireless access points 20. Each wireless access point 20 can be configured to communicate with one or more additional end hosts 12 via a wireless communications link.

In general, each core network device 10C and/or edge network device 10E can each be implemented as a switch (e.g., a multi-layer L2/L3 switch), a bridge, a router, a gateway, a hub, a repeater, a firewall, a wireless access point, a network device serving other networking functions, a network device that includes the functionality of two or more of these devices, a management device that controls the operation of one or more of these network devices, and/or other types of network devices. Configurations in which the edge network devices 10E are switches or routers, or generally include routing functionalities implementing desired routing protocols are described herein as an illustrative example.

The end host devices 12, sometimes referred to as host equipment, in network 8 such as end hosts 12-1 and 12-2 may each be a computer, a server or server equipment, a portable electronic device such as a cellular telephone, a laptop, other portable computing device, a network service and/or storage device, network management equipment that manages and controls the operation of one or more of host devices and network devices, and/or any other suitable types of specialized or general-purpose host computing equipment (e.g., running one or more client-side and/or server-side applications). Such network and host devices may sometimes be referred to herein generally as networking equipment. Networking equipment (e.g., network devices and host devices) in network 8 may be connected by one or more wired technologies or standards such as Ethernet (e.g., using copper cables and/or fiber optic cables), thereby forming a wired network portion of network 8 (e.g., including core network portion 8C and portions of edge network portions). If desired, network 8 may also include one or more wireless network portions that extend from the wired network portion.

In some configurations described herein as an example, edge network devices 10E may be configured to implement Ethernet Virtual Private Network or EVPN over core network 8C. Edge network devices 10E implementing EVPN technology may thus be referred to as EVPN peer devices. In these illustrative configurations, the EVPN peer devices may exchange EVPN route information such as EVPN Network Layer Reachability Information (NLRI) with one another over core network 8C. The EVPN NLRI may contain different types of route information such as Ethernet auto-discovery route information, MAC and IP address advertisement route information, and other EVPN route information (e.g., generally BGP EVPN routes as specified in RFC 7432). The EVPN route information, which can be conveyed using BGP messages containing the EVPN route information as an example, may be exchanged based on any suitable underlying transport layer and internet layer protocol(s) that facilitate communication across the underlay network 8C. Underlay network 8C (and the devices 10C therein) may provide and implement underlying infrastructure over which a VXLAN or MPLS overlay network (e.g., containing one or more corresponding tunnels) is implemented.

The use of BGP (e.g., MP-BGP) with a VXLAN or MPLS overlay network to implement the exchange of EVPN route information is merely illustrative. If desired, other routing protocols (or generally other control plane protocols) and/or other types of overlay network infrastructure may be used to facilitate the exchange of EVPN route information between EVPN peer devices.

Figure 2:
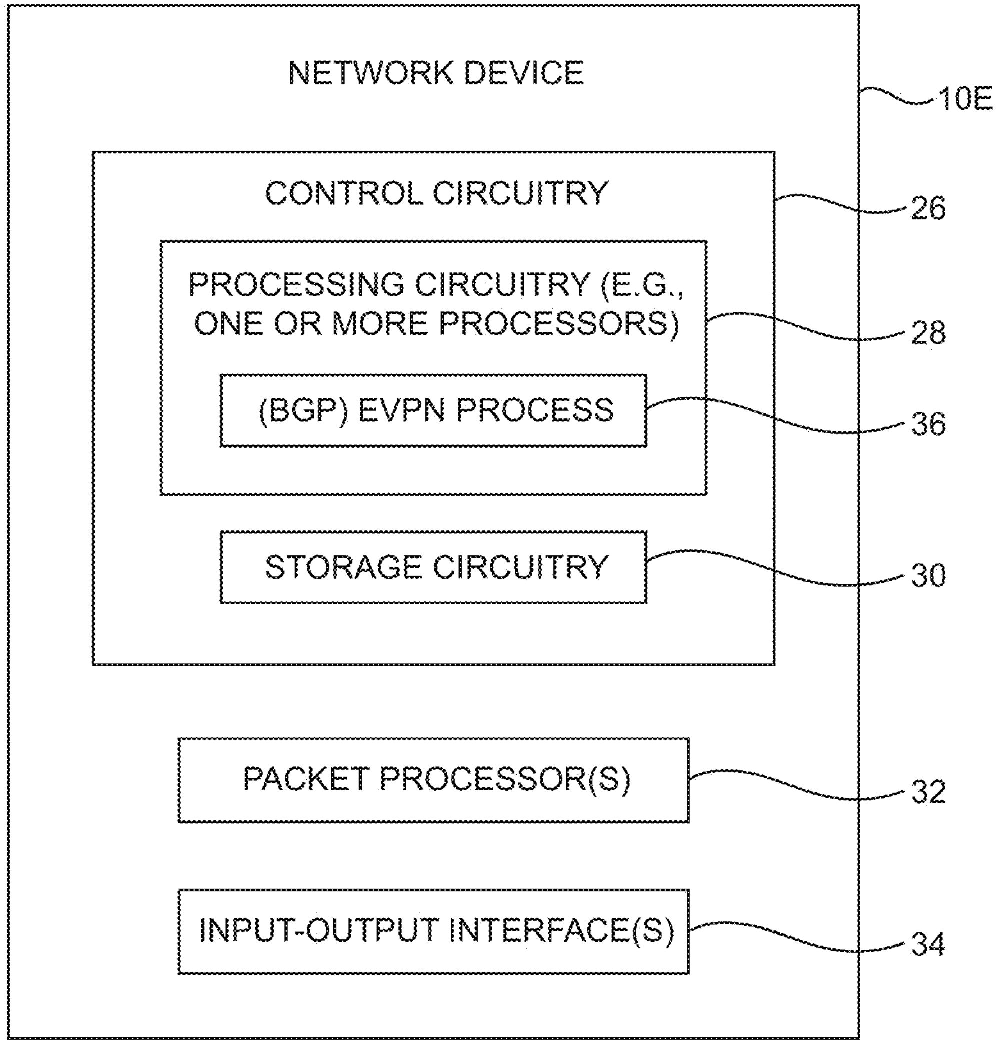
FIG. 2 is a diagram of an illustrative network device in accordance with some embodiments.

FIG. 2 is a diagram of an illustrative EVPN edge network device 10E configured to exchange routing information with other EVPN peer devices (e.g., using BGP). If desired, other network devices such as network devices 10C (FIG. 1), (customer) site edge network devices, and/or other network devices connected to the (provider) edge network devices may have at least some or all of the same components as the network device depicted in FIG. 2 but may optionally omit execution of a BGP and/or EVPN process at the processing circuitry.

As shown in FIG. 2, network device 10E may include control circuitry 26 having processing circuitry 28 and storage circuitry 30, one or more packet processors 32, and input-output interfaces 34 disposed within a housing of network device 10E. In one illustrative arrangement, network device 10E may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10E may be a fixed-configuration network device (e.g., a fixed-configuration switch having a fixed number of ports and/or a fixed hardware configuration).

Processing circuitry 28 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 28 may run (e.g., execute) a network device operating system and/or other software/firmware that is stored on storage circuitry 30. Storage circuitry 30 may include non-transitory (tangible) computer readable storage media that stores the operating system software and/or any other software code, sometimes referred to as program instructions, software, data, instructions, or code. As an example, the BGP and/or EVPN routing functions performed by network device 10E described herein may be stored as (software) instructions on the non-transitory computer-readable storage media (e.g., in portion(s) of memory circuitry 30 in network device 10E). The corresponding processing circuitry (e.g., one or more processors of processing circuitry 28 in network device 10E) may process or execute the respective instructions to perform the corresponding BGP and/or EVPN routing functions. Storage circuitry 30 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 10E), and/or other storage circuitry. Storage circuitry 30 is therefore sometimes referred to as memory circuitry. Processing circuitry 28 and memory circuitry 30 as described above may sometimes be referred to collectively as storage and processing circuitry or control circuitry 26 (e.g., implementing a control plane of network device 10E).

As just a few examples, processing circuitry 28 may execute network device control plane software such as operating system software, routing policy management software, routing protocol agents or processes (e.g., BGP and/or EVPN process 36), routing information base agents, and other control software, may be used to support the operation of protocol clients and/or servers (e.g., to form some or all of a communications protocol stack such as the TCP/IP stack), may be used to support the operation of packet processor(s) 32, may store packet forwarding information, may execute packet processing software, and/or may execute other software instructions that control the functions of network device 10E and the other components therein. The collective processing capabilities of the various EVPN network devices in a network can be referred to as an EVPN control plane.

Packet processor(s) 32 may be used to implement a data plane or forwarding plane of network device 10E. Packet processor(s) 32 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 32 may receive incoming network traffic via input-output interfaces 34, parse and analyze the received network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 30 and/or other memory circuitry integrated as part of or separate from packet processor 32.

Input-output interfaces 34 may include different types of communication interfaces such as Ethernet interfaces (e.g., one or more Ethernet ports), optical interfaces, a Bluetooth interface, a Wi-Fi interface, and/or other networking interfaces for connecting network device 10E to the Internet, a local area network, a wide area network, a mobile network, and generally other network device(s), peripheral devices, and other computing equipment (e.g., host equipment such as server equipment, user equipment, etc.). As an example, input-output interfaces 34 may include ports or sockets to which corresponding mating connectors of external components can be physically coupled and electrically connected. Ports may have different form-factors to accommodate different cables, different modules, different devices, or generally different external equipment.

In configurations in which network device 10E implements an EVPN with EVPN peer devices using BGP, processing circuitry 28 on network device 10E may execute a BGP EVPN process 36 (sometimes referred to herein as BGP EVPN agent 36). BGP EVPN process 36 may manage and facilitate operations as defined by or relevant to BGP and/or EVPN such as the exchange of network layer reachability information (e.g., EVPN NLRIs in the form of different EVPN routes) with other peer devices and the processing of the exchanged information. If desired, EVPN agent or process 36 may be implemented separately from a BGP agent or process.

As some examples of illustrative operations performed by processing circuitry 28, EVPN process 36 executing on processing circuitry 28 may receive peer-advertised routing information such as EVPN routes in the form of Ethernet auto-discovery routes, MAC and IP advertisement routes and/or other types of EVPN routes (e.g., having a route type of 1 and therefore sometimes referred to as EVPN type-1 routes), may perform path selection (e.g., best path computation based on BGP) using the peer-advertised information and/or other information, may advertise outbound information such as EVPN routes to its peers, and/or may perform other BGP and/or EVPN functions. Such information that can be advertised by an EVPN peer is sometimes referred to collectively as routing information or network reachability information.

While BGP EVPN process 36 is sometimes described herein to perform respective parts of BGP and/or EVPN operations for device 10E, this is merely illustrative. Processing circuitry 28 may be organized in any suitable manner (e.g., to have any other agents or processes instead of or in addition to a single BGP EVPN process 36) to perform different parts of the BGP and/or EVPN operations. Accordingly, processing circuitry 28 may sometimes be described herein to perform the BGP and/or EVPN operations instead of specifically referring to one or more agents, processes, and/or the kernel executed by processing circuitry 28.

The deployment of EVPN can present challenges given the multitude of different host devices that can be connected to the network and the various forwarding characteristics the host devices may require from the EVPN control plane. An example of this can be observed with respect to wired and wireless host devices, where mobility through wireless roaming is a normal behavioral pattern for wireless devices but would instead be an exception for wired host devices. Referring back to FIG. 1, a host device such as end host device 12-3 may be communicatively coupled to edge network device 10E-1 via a wireless connection with access point 20-1 (see wireless connection 24-1). Host device 12-3 that is communicatively coupled to edge network device 10E-1 via a wireless link can be referred to as a wireless end host.

During normal operation, wireless end host device 12-3 can roam from a coverage area of access point 20-1 to a coverage area of another access point. Each access point 20 can have its own wireless coverage area within which one or more client devices can reliably connect to and communicate with that access point. In the example of FIG. 1, host device 12-3 might roam or otherwise relocate from the coverage area of wireless access point 20-1 to the coverage area of another access point such as wireless access point 20-2 that is coupled to another edge network device 10E-2, as shown by arrow 26. After roaming to the new location (as shown by the location of device 12-3'), host device 12-3' can now communicate with the network via edge network device 10E-2 through a wireless communications link 24-2 with intervening access point 20-2.

Such a move of an end host between different edge network devices can sometimes be detected as a media access control (MAC) "mobility event" in the EVPN control plane. For example, if such a mobility event for a wired end host occurs N times within an M second window, the EVPN control plane might assume that there is a misconfiguration or a loop in the network, which can result in the end host being no longer advertised in the EVPN control plane until a corrective action is taken by an operator or administrator of the network. Such loop detection mechanism is sometimes referred to as duplicate MAC detection. Such EVPN control plane procedure might be appropriate for wired end hosts since wired end hosts are expected to be static in nature, with movement across different edge network devices to be an exception rather than the norm.

The number N can be equal to 3, 4, 5, 6, 7, 8, 9, 10, 4-6, 3-7, or other number greater than 10. Integer N that specifies a number of mobility events that an end host is allowed before a duplicate MAC detection is triggered is sometimes referred to and defined herein as a "mobility event count threshold." The number M can be equal to 100 seconds(s), 100-200 seconds, less than 100 seconds, more than 100 seconds, less than 200 seconds, more than 200 seconds, 200-300 seconds, more than 300 seconds, 300-500 seconds, 500-1000 seconds, hundreds or thousands of seconds, or other suitable period of time. Number M that specifies a window of time for which an end host is allowed to roam for N times before triggering a duplicate MAC detection is sometimes referred to and defined herein as a "mobility event duration threshold."

In contrast to wired host devices, wireless host devices are mobile by nature and can often roam from one access point to another access point, sometimes within a short period of time and where the access points can be connected to the same or different edge network devices 10E. Such movement between access points and edge network devices will result in a detected mobility event in the EVPN control plane. A mobility event for wireless end hosts is sometimes referred to as a roaming event or a wireless roaming event. Thus, if the same EVPN control plane procedures described above for wired end hosts are applied to wireless end hosts, then there would be high likelihood that the EVPN control plane will incorrectly assume a misconfiguration or loop in the network and mistakenly remove the wireless end host from the network.

To address this problem while continuing to provide duplicate MAC detection for both wired and wireless end hosts within a single EVPN fabric, network 8 can be configured to advertise host profiles, where different host profile identifiers (IDs) can be used to define parameters within the EVPN control plane for that specific host device. The host profile identifier can optionally be included in a type-2 (MAC) route that is advertised by an edge network device (e.g., the host profile ID can be advertised within a new BGP extended community attached to the route). In a BGP context, an extended community can refer to a BGP attribute that is used to carry additional information along with a BGP route announcement. BGP extended communities thus provide a way to tag routes with additional attributes or information beyond what is typically included in standard BGP attributes.

In accordance with an embodiment, a new BGP extended community would advertise a host's device profile, where the profile can be represented by a host profile identifier (value). The host profile ID can have an EVPN domain-wide significance and can be associated with a set of administrative EVPN parameters. The set of administrative EVPN parameters, sometimes referred to as EVPN control plane parameters, can be defined on the edge network devices 10E within the EVPN domain. For example, to support device specific duplicate MAC detection, the EVPN control plane (administrative) parameters may be used to set non-default or custom N and M values for the MAC address advertised in the type-2 route.

Figure 3:
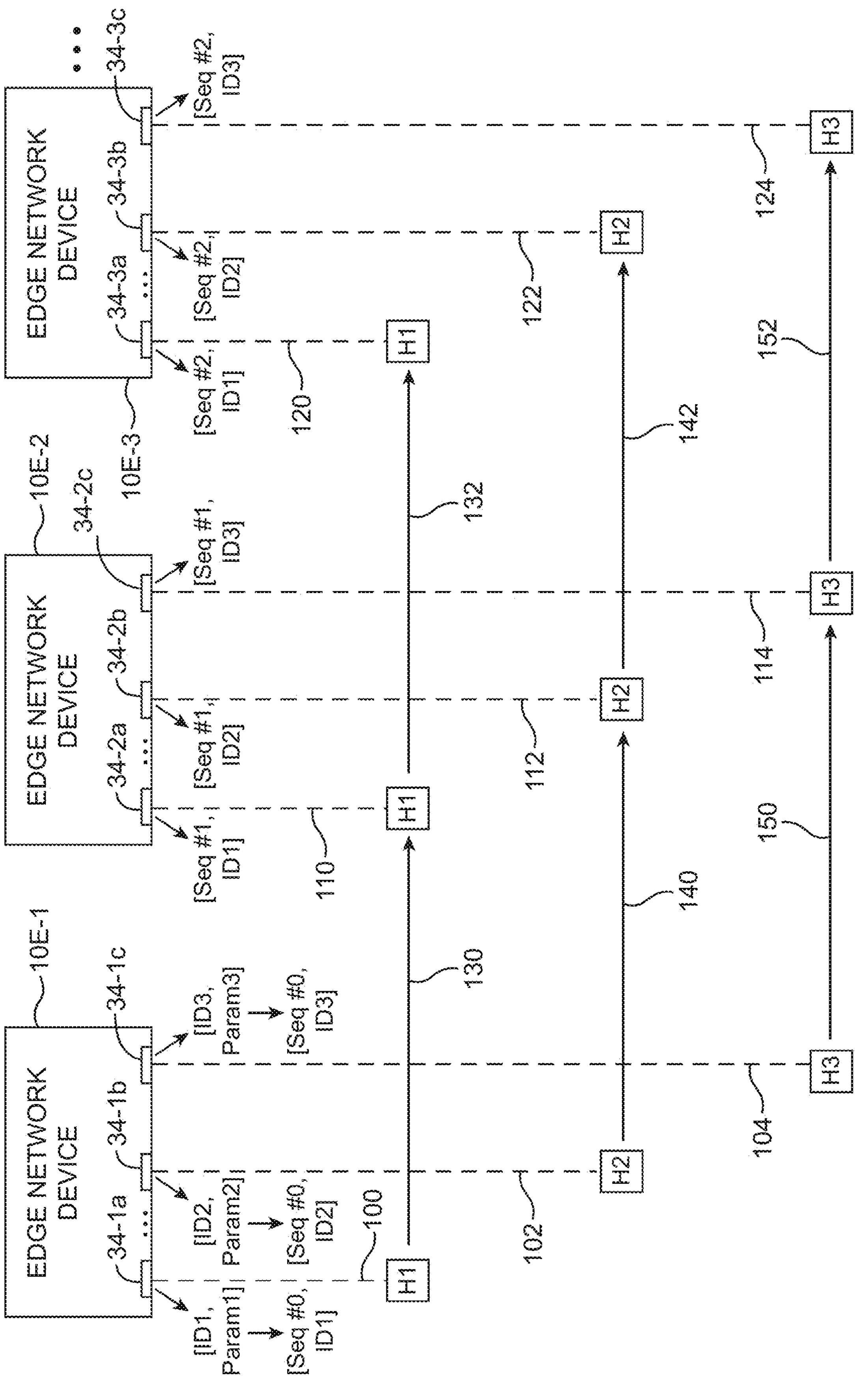
FIG. 3 is a diagram showing how different classes of end hosts can roam across various edge network devices in accordance with some embodiments.

In general, different classes of end host devices can each be associated with a different set of administrative EVPN control plane parameters. FIG. 3 is a diagram showing how different classes of end hosts can roam from one edge network device to another in accordance with some embodiments. As shown in FIG. 3, a first host device H1 may be communicatively coupled to a first local interface 34-1*a* of edge network device 10E-1 via a first communications link 100; a second host device H2 may be communicatively coupled to second local interface 34-1*b* of edge network device 10E-1 via a second communications link 102; and a third host device H3 may be communicatively coupled to third local interface 34-1*c* of edge network device 10E-1 via a third communications link 104. Communications link 100 connecting host device H1 to edge network device 10E-1 may be a wired connection, a wireless connection (including an intervening wireless access point), or other types of connection. Communications link 102 connecting host device H2 to edge network device 10E-1 may be a wired connection, a wireless connection (including an intervening wireless access point), or other types of connection. Communications link 104 connecting host device H3 to edge network device 10E-1 may be a wired connection, a wireless connection (including an intervening wireless access point), or other types of connection. Interfaces 34-1*a*, 34-1*b*, and 34-1*c* can represent logical or physical interfaces on edge network device 10E-1.

In the example of FIG. 3, host device H1 can represent or belong to a first class of end hosts, host device H2 can represent or belong to a second class of end hosts different than the first class, and host device H3 can represent or belong to a third class of end hosts different than the first and second classes. Different classes of end host devices might include: wired end hosts (e.g., a first class of host/client devices), wireless end hosts (e.g., a second class of host/client devices), virtual machines (e.g., a third class of host/client devices), containers (e.g., a fourth class of host/client devices), mobile devices such as robots roaming around in a warehouse, and/or other types of end host devices. One of the different classes of end hosts can include a default class of end hosts. As an example, wired end hosts can optionally be categorized as a default class of end host devices.

Different classes of host devices can have different host profile identifiers, which are associated with different sets of EVPN control plane parameters. In the example of FIG. 3, host device H1, which belongs to a first class of end hosts, can be assigned a first host profile identifier ID1 and thus paired with a corresponding first set of EVPN control plane parameters Param1. Host device H2, which belongs to a second class of end hosts, can be assigned a second host profile identifier ID2 and thus paired with a corresponding second set of EVPN control plane parameters Param2 different than Param1. Host device H3, which belongs to a third class of end hosts, can be assigned a third host profile identifier ID3 and thus paired with a corresponding third set of EVPN control plane parameters Param3 different than Param1 and Param2.

This is also shown in FIG. 7. For example, the first set of control plane parameters Param1 might specify a first mobility event count threshold N1, a mobility event duration threshold M, and/or other administrative control parameter (s); the second set of control plane parameters Param2 might specify a second mobility event count threshold N2 different than N1, the mobility event duration threshold M (same as that specified in Param1), and/or other administrative control parameter(s); and the third set of control plane parameters Param3 might specify a third mobility event count threshold N3 different than N1 or N2, the mobility event duration threshold M (same as that specified in Param1 and Param2), and/or other administrative control parameter(s).

Referring back to FIG. 3, edge network device 10E-1 can advertise EVPN network reachability information for its connected end host devices. In accordance with some embodiments, edge network device 10E-1 can advertise, for each connected end host, a host profile identifier along with an associated sequence number. The sequence number can refer to and be defined herein as a number that indicates a cumulative number of times that an end host device has recently roamed since establishing a connection with the network via edge network device 10E-1. Assuming none of hosts H1, H2, and H3 has roamed or otherwise undergone a mobility event, edge network device 10E-1 can advertise for host H1 a host profile ID1 along with a sequence number of "0", can advertise for host H2 a host profile ID2 along with a sequence number of "0", and can advertise for host H3 a host profile ID3 along with a sequence number of "0". The sequence number for any given host device will follow that host device in a mobility event.

In the event that host device H1 roams from edge network device 10E-1 to edge network device 10E-2 (as illustrated by arrow 130), edge network device 10E-2 can detect the presence of host device H1 via connection path 110 at local interface 34-2*a*. Local interface 34-2*a* can represent a physical or logical interface of device 10E-2. In response to detecting host H1 at local interface 34-2*a*, edge network device 10E-2 can advertise to its peers host profile ID1 along with an incremented sequence number of "1" since the network has detected at least one mobility/roaming event. Subsequently, in the event that host device H1 roams from edge network device 10E-2 to edge network device 10E-3 (as illustrated by arrow 132), edge network device 10E-3 can detect the presence of host device H1 via connection path 120 at local interface 34-3*a*. Local interface 34-3*a* can represent a physical or logical interface of device 10E-3. In response to detecting host H1 at local interface 34-3*a*, edge network device 10E-3 can advertise to its peers host profile ID1 along with an incremented sequence number of "2" since the network has detected an additional mobility/roaming event.

Host device H2 might also roam between the various edge network devices. In the event that host device H2 roams from edge network device 10E-1 to edge network device 10E-2 (as illustrated by arrow 140), edge network device 10E-2 can detect the presence of host device H2 via connection path 112 at local interface 34-2*b*. Local interface 34-2*b* can represent a physical or logical interface of device 10E-2. In response to detecting host H2 at local interface 34-2*b*, edge network device 10E-2 can advertise to its peers host profile ID2 along with an incremented sequence number of "1" since the network has detected at least one mobility/roaming event. Subsequently, in the event that host device H2 roams from edge network device 10E-2 to edge network device 10E-3 (as illustrated by arrow 142), edge network device 10E-3 can detect the presence of host device H2 via connection path 122 at local interface 34-3*b*. Local interface 34-3*b* can represent a physical or logical interface of device 10E-3. In response to detecting host H2 at local interface 34-3*b*, edge network device 10E-3 can advertise to its peers host profile ID2 along with an incremented sequence number of "2" since the network has detected an additional mobility/roaming event.

Host device H3 might also roam between the various edge network devices. In the event that host device H3 roams from edge network device 10E-1 to edge network device 10E-2 (as illustrated by arrow 150), edge network device 10E-2 can detect the presence of host device H3 via connection path 114 at local interface 34-2*c*. Local interface 34-2*c* can represent a physical or logical interface of device 10E-2. In response to detecting host H3 at local interface 34-2*c*, edge network device 10E-2 can advertise to its peers host profile ID3 along with an incremented sequence number of "1" since the network has detected at least one mobility/roaming event. Subsequently, in the event that host device H3 roams from edge network device 10E-2 to edge network device 10E-3 (as illustrated by arrow 152), edge network device 10E-3 can detect the presence of host device H3 via connection path 124 at local interface 34-3*c*. Local interface 34-3*c* can represent a physical or logical interface of device 10E-3. In response to detecting host H3 at local interface 34-3*c*, edge network device 10E-3 can advertise to its peers host profile ID3 along with an incremented sequence number of "2" since the network has detected an additional mobility/roaming event.

The example of FIG. 3 in which an EVPN network can be connected to three different classes of end hosts is illustrative. In general, an EVPN network can be communicatively coupled to two or more different classes (or types) of end host devices, three or more different classes of end host devices, four to ten different classes of end host devices, or more than 10 different classes of end host devices that might exhibit different behavioral patterns requiring different sets of EVPN administrative parameters for ensuring minimal undesired network disruptions.

Figure 4:
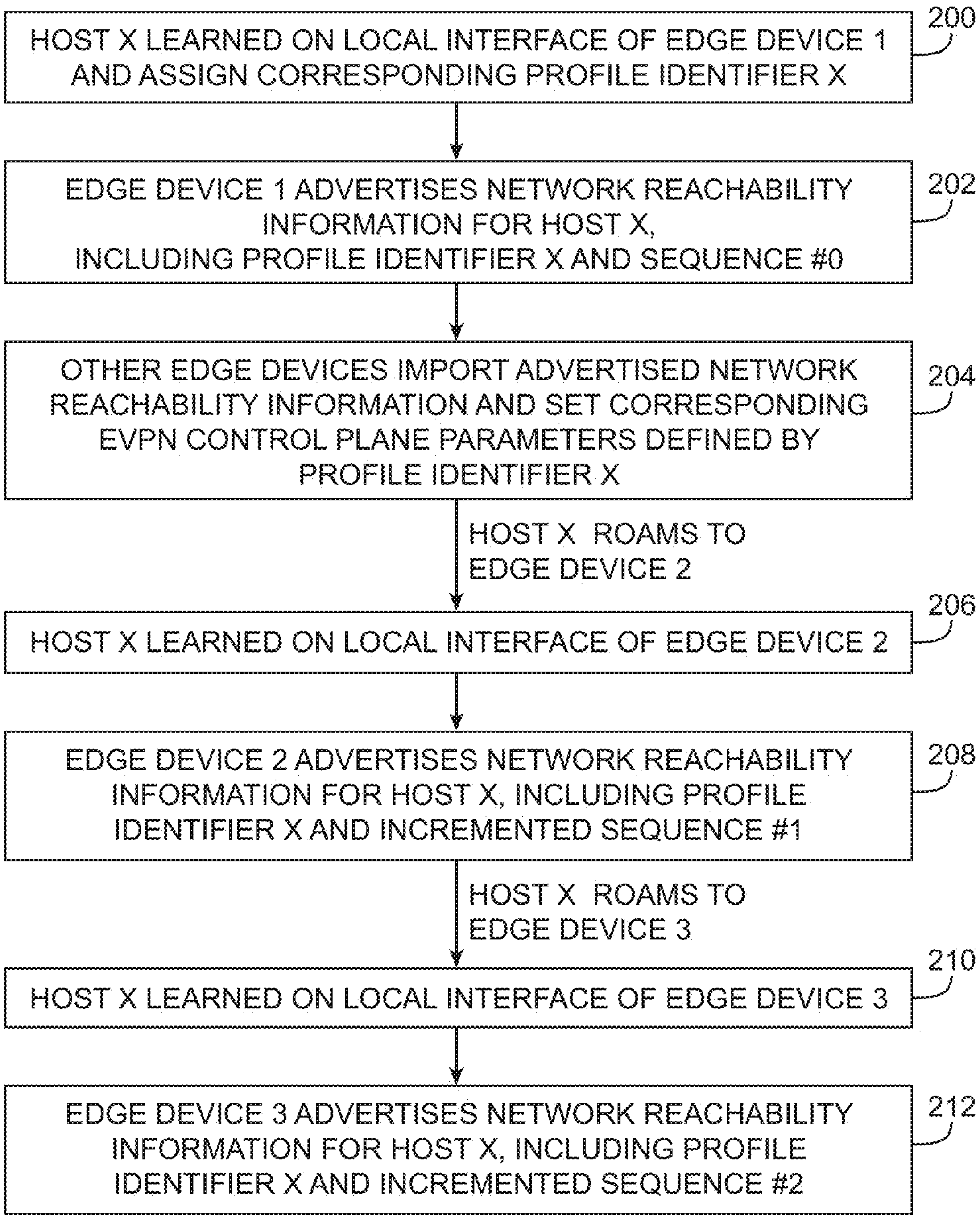
FIG. 4 is a flowchart of illustrative steps for operating a network of the type shown in FIGS. 1-3 in accordance with some embodiments.

FIG. 4 is a flowchart of illustrative steps for operating a network of the type described in connection with FIGS. 1-3. During the operations of block 200, a host device such as host device X can be learned on a local (logical or physical) interface of a first edge network device. The first edge network device can determine the class or type of the connected host device X via a port-to-class mapping that can be manually configured or via automatic detection based on traffic from host device X (e.g., via a Link Layer Discovery Protocol or LLDP). Link Layer Discovery Protocol may be a layer-2 IEEE protocol used in Ethernet or EVPN networks for discovering and advertising information for connected devices. LLDP may allow for vendor specific information to be transmitted (e.g., by allowing access points to indicate the nature, behavior, and/or class of any connected end hosts).

As a result, the first edge network device can assign a corresponding host profile identifier X to host device X. In general, the host profile ID can be statically or dynamically assigned based on the physical or local interface (port) at which a particular host is learnt. This will, for example, allow wireless hosts attached to an edge network device via specific virtual local area networks (VLANs) or interfaces to be assigned a specific host profile ID while allowing wired hosts connected to the edge network device via separate VLANs or physical interfaces to be assigned a different host profile ID.

During the operations of block 202, the first edge network device can advertise network reachability information or other route information for host device X. The advertised information can optionally be included as part of an EVPN extended community and can include the corresponding host profile identifier X, an associated sequence number, MAC/IP addresses of host device X, and/or other routing information. Assuming host device X has not yet experienced a mobility/roaming event, host device X may have a current sequence number equal to "0." In general, all edge network devices maintain a sequence number table for each host device. This sequence number table can be, for example, keyed or indexed by the associated VLAN identifier and MAC address. In this example where host device X has not yet experienced a mobility event, the first edge network device would not be able to find an existing sequence number for host X in the sequence number table. In such scenario, the first edge network device where host X is learned can add host X with sequence number "0" to its local sequence number table. When the first edge network device advertises a MAC-IP route, other edge network devices can discover this newly added host X and can install this host X into their respective local sequence number tables. In other words, an EVPN speaking edge network device should attach the EVPN MAC mobility information, which includes the sequence number, when advertising the network reachability information for a local host so that other edge network devices can synchronize the sequence number for that host.

During the operations of block 204, one or more other edge devices in the network can import, into their bridge domain, the advertised network reachability information for host device X received from the first edge network device and then set corresponding EVPN control plane (administrative) parameters defined by or associated with the advertised host profile identifier X. As a result, the one or more other edge devices in the network will use the EVPN control plane parameters associated with host profile identifier X for detecting duplicate MAC addresses for host device X. If desired, different host profile identifiers can be assigned to or associated with different network policies such as different roaming policies, different security policies, different access control or traffic flow rate policies, etc.

Sometime later, host device X might roam from the first edge network device to a second edge network device. Such mobility event can trigger the operations of block 206. During the operations of block 206, newly relocated host device X can be learned on a local (logical or physical) interface of the second edge network device. The second edge network device can determine the class or type of the connected host device X via a port-to-class mapping that can be manually configured or via automatic detection based on traffic from host device X (e.g., via LLDP).

During the operations of block 208, the second edge network device can advertise network reachability information or other route information for the newly learnt host device X. The advertised information can optionally be included as part of an EVPN extended community and can include the corresponding host profile identifier X, an associated sequence number, MAC/IP addresses of host device X, and/or other routing information. Since host device X has roamed once, host device X may have a current sequence number incremented to "1." The sequence number for the host device X is advertised and held by the associated second edge network device and is thus incremented by the second edge network device.

Sometime later, host device X might roam from the second edge network device to a third edge network device. Such mobility event can trigger the operations of block 210. During the operations of block 210, newly relocated host device X can be learned on a local (logical or physical) interface of the third edge network device. The third edge network device can determine the class or type of the connected host device X via a port-to-class mapping that can be manually configured or via automatic detection based on traffic from host device X (e.g., via LLDP).

During the operations of block 212, the third edge network device can advertise network reachability information or other route information for the newly learnt host device X. The advertised information can optionally be included as part of an EVPN extended community and can include the corresponding host profile identifier X, an associated sequence number, MAC/IP addresses of host device X, and/or other routing information. Since host device X has roamed twice, host device X may have a current sequence number incremented to "2."

The operations of FIG. 4 are illustrative. The operations can continue as host device X roams among the various edge network devices in the network. Host device X can continuously roam to new edge devices or can optionally return to previously connected edge devices. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

Figure 5:
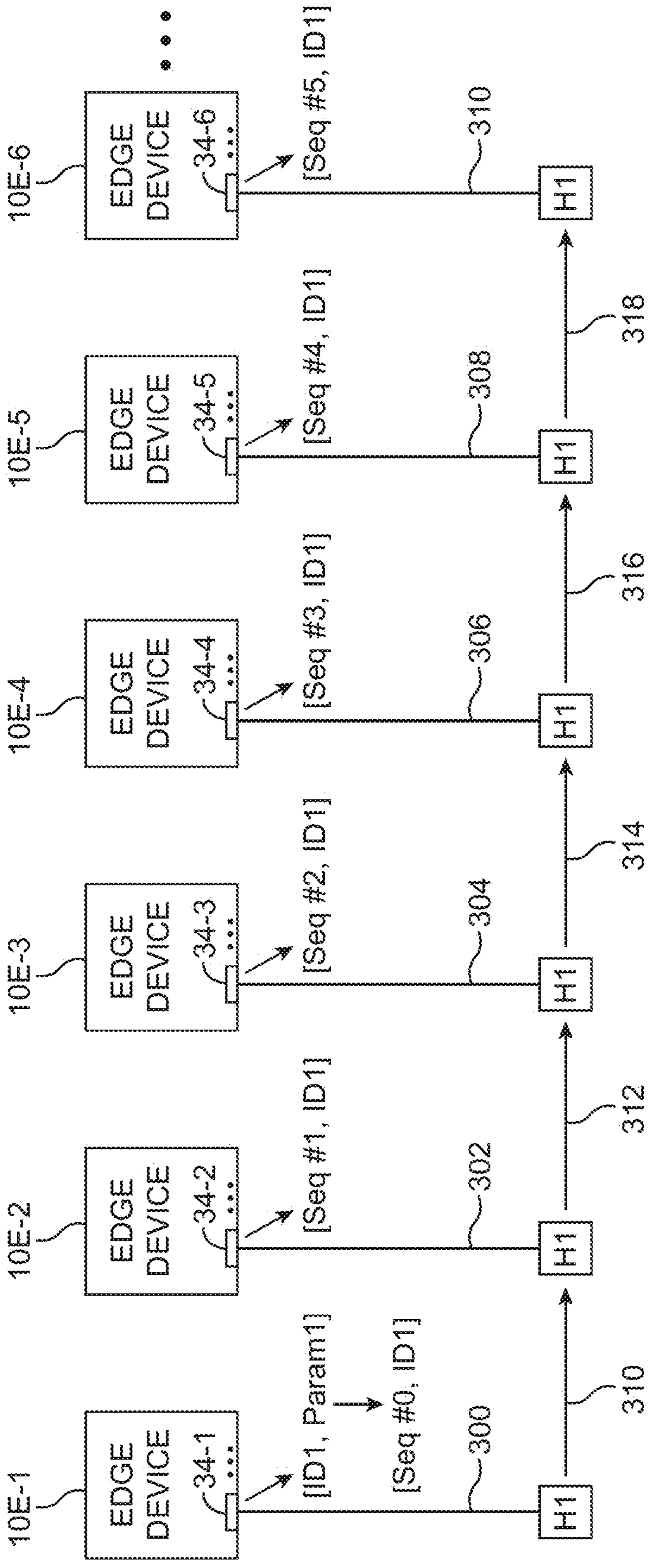
FIG. 5 is a diagram showing how an end host of a first class can roam among different edge network devices a number of times in accordance with some embodiments.

FIG. 5 is a diagram showing how an end host of a first class can roam among different edge network devices a number of times and then subsequently be removed or disconnected from the network. As shown in FIG. 5, a first end host H1 may be a wired host device that is initially connected to a first edge device 10E-1 (e.g., via wired connection 300). In response to being detected or learned at interface 34-1 of edge device 10E-1, edge device 10E-1 can advertise network reachability information of host H1, including a corresponding host profile identifier ID1 and a first set of EVPN control plane parameters Param1 associated with ID1. Host profile identifier ID1 can further be associated with a sequence number with a current value of "0", assuming host H1 has not yet experienced a mobility event. In this example, Param1 may have a default mobility event count threshold N equal 5 and a default mobility event duration threshold M equal to 200 seconds.

Sometime later, host device H1 can roam from edge device 10E-1 to a second edge device 10E-2, as shown by arrow 310. After this first mobility (roaming) event, host device H1 may be connected to the second edge device 10E-2 via wired connection 302. In response to being detected or learned at interface 34-2 of edge device 10E-2, edge device 10E-2 can advertise network reachability information of host H1, including corresponding host profile identifier ID1 and a sequence number with an incremented value of "1" since host H1 has just experienced a first mobility event.

Sometime later, host device H1 can roam from edge device 10E-2 to a third edge device 10E-3, as shown by arrow 312. After this second mobility (roaming) event, host device H1 may be connected to the third edge device 10E-3 via wired connection 304. In response to being detected or learned at interface 34-3 of edge device 10E-3, edge device 10E-3 can advertise network reachability information of host H1, including corresponding host profile identifier ID1 and a sequence number with an incremented value of "2" since host H1 has just experienced a second mobility event.

Sometime later, host device H1 can roam from edge device 10E-3 to a fourth edge device 10E-4, as shown by arrow 314. After this third mobility (roaming) event, host device H1 may be connected to the fourth edge device 10E-4 via wired connection 306. In response to being detected or learned at interface 34-4 of edge device 10E-4, edge device 10E-4 can advertise network reachability information of host H1, including corresponding host profile identifier ID1 and a sequence number with an incremented value of "3" since host H1 has just experienced a third mobility event.

Sometime later, host device H1 can roam from edge device 10E-4 to a fifth edge device 10E-5, as shown by arrow 316. After this fourth mobility (roaming) event, host device H1 may be connected to the fifth edge device 10E-5 via wired connection 308. In response to being detected or learned at interface 34-5 of edge device 10E-5, edge device 10E-5 can advertise network reachability information of host H1, including corresponding host profile identifier ID1 and a sequence number with an incremented value of "4" since host H1 has just experienced a fourth mobility event.

Sometime later, host device H1 can roam from edge device 10E-5 to a sixth edge device 10E-6, as shown by arrow 318. After this fifth mobility (roaming) event, host device H1 may be connected to the sixth edge device 10E-6 via wired connection 310. In response to being detected or learned at interface 34-6 of edge device 10E-6, edge device 10E-6 can advertise network reachability information of host H1, including corresponding host profile identifier ID1 and a sequence number with an incremented value of "5" since host H1 has just experienced a fifth mobility event.

In this example, Param1 has a default mobility event count threshold N equal 5 and a default mobility event duration threshold M equal to 200 seconds. This determination can occur at each edge device 10E by comparing the current sequence number associated with the end host device to the associated mobility event count threshold. Since the current sequence number (e.g., "5") is now equal to the mobility event count threshold N=5 defined by Param1 for host profile ID1 and assuming the five mobility events occurred within a total time period less than or equal to the duration threshold M of 200 seconds, then the EVPN network can determine that a duplicate MAC address has been detected for host device H1 and then subsequently remove host device H1 from the network. In other embodiments, the network can alternatively block or drop traffic from host device H1 in response to detecting that the actions of host device H1 has violated the corresponding EVPN control plane parameters Param1.

Figure 6:
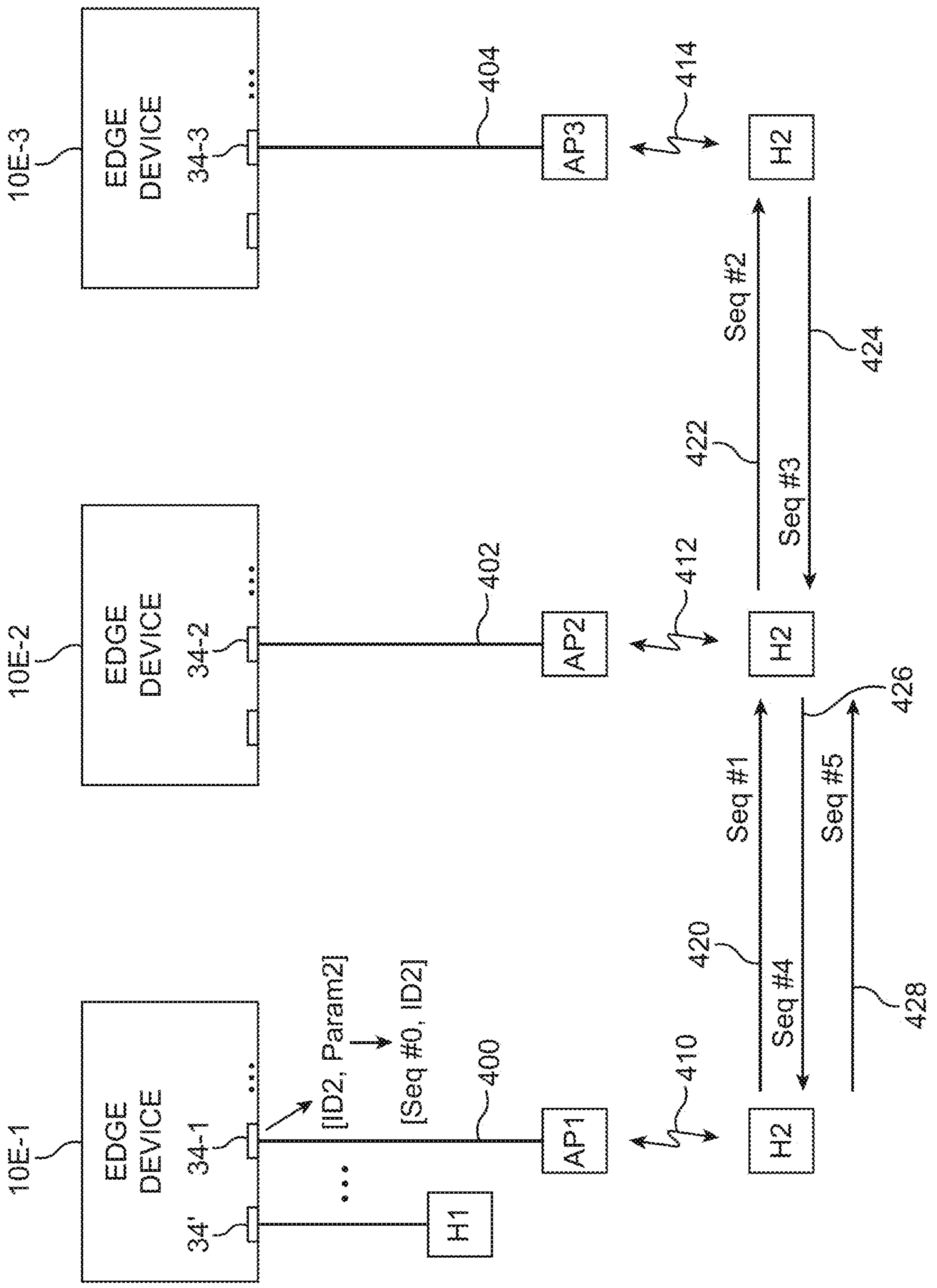
FIG. 6 is a diagram showing how an end host of a second class can roam among different edge network devices a number of times in accordance with some embodiments.

The example of FIG. 5 in which a wired end host H1 is removed from the network after a certain number of mobility events is illustrative. FIG. 6 is a diagram showing how an end host of a second class, different than the first class, can roam among different edge network devices a number of times but can remain connected to the network. As shown in FIG. 6, a second end host H2 may be a wireless host device that is initially connected to a first edge device 10E-1 (e.g., via a wireless connection 410 through intervening access point AP1). In response to being detected or learned at interface 34-1 of edge device 10E-1, edge device 10E-1 can advertise network reachability information of host H2, including a corresponding host profile identifier ID2 and a second set of EVPN control plane parameters Param2 associated with ID2. Host profile identifier ID2 can further be associated with a sequence number with a current value of "0", assuming host H2 has not yet experienced a mobility event. In this example, Param2 may have a configurable mobility event count threshold N equal 10 and a configurable mobility event duration threshold M equal to 200 seconds. Edge device 10E-1 can optionally be coupled to one or more wired end host(s) H1, as shown by a wired connection to local interface 34'.

Sometime later, host device H2 can roam from edge device 10E-1 to second edge device 10E-2, as shown by arrow 420. After this first mobility (roaming) event, host device H2 may be connected to the second edge device 10E-2 via wireless connection 412 (e.g., through an intervening wireless access point AP2). Access point AP2 may be coupled to local interface 34-2 of edge device 10E-2 via a wired connection 402. In response to being detected or learned at interface 34-2 of edge device 10E-2, edge device 10E-2 can then advertise network reachability information of host H2, including corresponding host profile identifier ID2 and a sequence number with an incremented value of "1" since host H2 has just experienced a first mobility event.

Sometime later, host device H2 can roam from second edge device 10E-2 to third edge device 10E-3, as shown by arrow 422. After this second mobility (roaming) event, host device H2 may be connected to the third edge device 10E-3 via wireless connection 414 (e.g., through an intervening wireless access point AP3). Access point AP3 may be coupled to local interface 34-3 of edge device 10E-2 via a wired connection 404. In response to being detected or learned at interface 34-3 of edge device 10E-3, edge device 10E-3 can then advertise network reachability information of host H2, including corresponding host profile identifier ID2 and a sequence number with an incremented value of "2" since host H2 has just experienced a second mobility event.

Sometime later, host device H2 can roam from third edge device 10E-3 back to second edge device 10E-2, as shown by arrow 424. After this third mobility (roaming) event, host device H2 may again be connected to the second edge device 10E-2 via wireless connection 412 (e.g., through intervening wireless access point AP2). In response to being detected or learned at interface 34-2 of edge device 10E-2, edge device 10E-2 can then advertise network reachability information of host H2, including corresponding host profile identifier ID2 and a sequence number with an incremented value of "3" since host H2 has just experienced a third mobility event.

Sometime later, host device H2 can roam from second edge device 10E-2 back to first edge device 10E-1, as shown by arrow 426. After this fourth mobility (roaming) event, host device H2 may again be connected to the first edge device 10E-1 via wireless connection 410 (e.g., through intervening wireless access point AP1). In response to being detected or learned at interface 34-1 of edge device 10E-1, edge device 10E-1 can then advertise network reachability information of host H2, including corresponding host profile identifier ID2 and a sequence number with an incremented value of "4" since host H2 has just experienced a fourth mobility event.

Sometime later, host device H2 can roam from first edge device 10E-1 back to second edge device 10E-2, as shown by arrow 428. After this fifth mobility (roaming) event, host device H2 may again be connected to the second edge device 10E-2 via wireless connection 412 (e.g., through intervening wireless access point AP2). In response to being detected or learned at interface 34-2 of edge device 10E-2, edge device 10E-2 can then advertise network reachability information of host H2, including corresponding host profile identifier ID2 and a sequence number with an incremented value of "5" since host H2 has just experienced a fifth mobility event.

In this example, Param2 has a configurable mobility event count threshold N equal 10 and a configurable mobility event duration threshold M equal to 200 seconds. The configurable mobility event duration threshold M of Param2 can, in general, be equal to or different than the configurable mobility event duration threshold M of Param1. Since the current sequence number (e.g., "5") is still less than the mobility event count threshold N=10 defined by Param2 for host profile ID2, the EVPN network can determine that a duplicate MAC address has not been detected for host device H2 and will allow host device H2 to continue roaming without issuing an alert. This determination can occur at each edge device 10E by comparing the current sequence number associated with the end host device to the associated mobility event count threshold. Operating a network in this way can be technically advantageous and beneficial to help ensure that duplicate MAC detection is enabled for different classes of end hosts in an EVPN domain and to allow appropriate EVPN control plane parameters to be defined for each of the different classes of end hosts to account for the different behavioral characteristics.

The use of profiles or profile identifiers for labeling different classes or types of end host or client devices in a network is exemplary. If desired, the use of profile identifiers can be extended beyond mobility or roaming use cases. In other embodiments, different host profile identifiers can be assigned to or associated with different network policies such as different roaming policies, different network security policies, different access control or traffic flow rate policies, etc.

The methods and operations described above in connection with FIGS. 1-7 may be performed by the components of one or more network devices and/or server or other host equipment using software, firmware, and/or hardware (e.g., dedicated circuitry or hardware). Software code for performing these operations may be stored on non-transitory computer readable storage media (e.g., tangible computer readable storage media) stored on one or more of the components of the network device(s) and/or server or other host equipment. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other host equipment (e.g., processing circuitry 28 in network device(s) 10E, packet processor(s) 32 in network device(s) 10E, etc.).

The foregoing is merely illustrative and various modifications can be made to the described embodiments. The foregoing embodiments may be implemented individually or in any combination.

What is claimed is:

1. A method of operating a network device, comprising:

detecting a first host device being communicatively coupled to a first interface of the network device;

identifying a first host profile identifier corresponding to a first class of devices to which the first host device belongs, wherein the first class of devices comprises wired end host devices;

detecting a second host device being communicatively coupled to a second interface of the network device;

identifying a second host profile identifier corresponding to a second class of devices to which the second host device belongs, wherein the second class of devices comprises wireless end host devices;

advertising, to one or more additional network devices, network reachability information for the first host device, wherein the network reachability information for the first host device comprises at least the first host profile identifier associated with the first host device;

applying a first network policy to the first host device based on a first set of administrative parameters corresponding to the first host profile identifier; and applying a second network policy to the second host device based on a second set of administrative parameters, different than the first set of administrative parameters, corresponding to the second host profile identifier.

2. The method of claim 1, wherein the network reachability information for the first host device further comprises a sequence number associated with the first host device, and wherein the sequence number indicates a cumulative number of mobility events taken by the first host device.

3. The method of claim 2, wherein:

the first set of administrative parameters comprises a first mobility event count threshold; and the second set of administrative parameters comprises a second mobility event count threshold different than the first mobility event count threshold.

4. The method of claim 3, wherein:

the first set of administrative parameters further comprises a first mobility event duration threshold; and the second set of administrative parameters further comprises a second mobility event duration threshold.

5. The method of claim 3, further comprising:

comparing the sequence number associated with the first host device to the first mobility event count threshold.

6. The method of claim 5, further comprising:

in response to determining that the sequence number associated with the first host device is equal to the first mobility event count threshold, disconnecting the first host device from the network device, blocking traffic from the first host device, or dropping traffic from the first host device.

7. The method of claim 1, wherein identifying the first host profile identifier corresponding to the first class of devices to which the first host device belongs comprises mapping the first interface to the first class of devices.

8. The method of claim 1, wherein identifying the first host profile identifier corresponding to the first class of devices to which the first host device belongs comprises identifying the first host profile identifier using a Link Layer Discovery Protocol (LLDP).

9. The method of claim 1, wherein the network reachability information for the first host device further comprises a first sequence number that tracks a cumulative number of times that the first host device has roamed among the network device and the one or more additional network devices within a first period of time.

10. The method of claim 8, further comprising:

advertising, to the one or more additional network devices, a second sequence number for the second host device, wherein the second sequence number tracks a cumulative number of times that the second host device has roamed among the network device and the one or more additional network devices within a second period of time.

11. The method of claim 10, further comprising:

comparing the first sequence number to a threshold in the first set of administrative parameters; and comparing the second sequence number to a threshold in the second set of administrative parameters.

12. The method of claim 9, further comprising:

determining whether a third host device communicatively coupled to the network device is part of the first class of devices, the second class of devices, or a third class of devices; and in response to determining that the third host device is part of the third class of devices, applying a third network policy to the third host device based on a third set of administrative parameters different than the first and second sets of administrative parameters.

13. A non-transitory computer-readable storage medium storing one or more programs configured to be executed by a network device in a wireless network, the one or more programs comprising instructions for:

detecting a first host device being communicatively coupled to a first interface of the network device;

identifying a first host profile identifier corresponding to a first class of devices to which the first host device belongs, wherein the first class of devices comprises wired end host devices;

detecting a second host device being communicatively coupled to a second interface of the network device;

identifying a second host profile identifier corresponding to a second class of devices to which the second host device belongs, wherein the second class of devices comprises wireless end host devices;

advertising, to one or more additional network devices, network reachability information for the first host device, wherein the network reachability information for the first host device comprises the first host profile identifier associated with the first host device;

applying a first network policy to the first host device based on a first set of control plane parameters corresponding to the first host profile identifier; and applying a second network policy to the second host device based on a second set of control plane parameters, different than the first set of control plane parameters, corresponding to the second host profile identifier.

14. The non-transitory computer-readable storage medium of claim 13, wherein the network reachability information for the first host device further comprises a sequence number associated with the first host device, and wherein the sequence number indicates a cumulative number of mobility events taken by the first host device.

15. The non-transitory computer-readable storage medium of claim 14, wherein:

the first set of control plane parameters comprises a first mobility event count threshold; and the second set of control plane parameters comprises a second mobility event count threshold different than the first mobility event count threshold.

16. The non-transitory computer-readable storage medium of claim 15, wherein:

the first set of control plane parameters comprises a first mobility event duration threshold; and the second set of control plane parameters comprises a second mobility event duration threshold.

17. The non-transitory computer-readable storage medium of claim 16, wherein the one or more programs further comprise instructions for:

comparing the sequence number associated with the first host device to the first mobility event count threshold.

18. The non-transitory computer-readable storage medium of claim 16, wherein the one or more programs further comprise instructions for:

in response to determining that the sequence number associated with the first host device is equal to the first mobility event count threshold, disconnecting the first host device from the network device, blocking traffic from the first host device, or dropping traffic from the first host device.

19. The non-transitory computer-readable storage medium of claim 13, wherein the instructions for identifying the first host profile identifier corresponding to the first class of devices to which the first host device belongs comprises instructions for mapping the first interface to the first class of devices.

20. The non-transitory computer-readable storage medium of claim 13, wherein the instructions for identifying the first host profile identifier corresponding to the first class of devices to which the first host device belongs comprises instructions for identifying the first host profile identifier using a Link Layer Discovery Protocol (LLDP).

* * * * *